March 1, 1966  H. T. BLAISE  3,237,897
ADAPTER DEVICE FOR ATTACHING A TOOL UNIT TO A
HORIZONTAL BORING MILL
Filed Oct. 7, 1964  2 Sheets-Sheet 1

Herman T. Blaise,
INVENTOR.

BY
ATTORNEYS

March 1, 1966  H. T. BLAISE  3,237,897
ADAPTER DEVICE FOR ATTACHING A TOOL UNIT TO A
HORIZONTAL BORING MILL Filed Oct. 7, 1964  2 Sheets-Sheet 2

Herman T. Blaise
INVENTOR.

BY
ATTORNEYS

United States Patent Office 3,237,897
Patented Mar. 1, 1966

3,237,897
ADAPTER DEVICE FOR ATTACHING A TOOL UNIT TO A HORIZONTAL BORING MILL
Herman T. Blaise, Huntsville, Ala., assignor to the United States of America as represented by the Secretary of the Army
Filed Oct. 7, 1964, Ser. No. 402,367
4 Claims. (Cl. 248—16)
(Granted under Title 35, U.S. Code (1952), sec. 266)

The invention described herein may be manufactured and used by or for the Government for governmental purposes without the payment of any royalty thereon.

This invention relates to an adapter device for use with a milling machine, and more particularly to a device adapted for interchangeably supporting various tool units or heads on the headstock of a heavy-duty, commercial boring mill.

In the use of heavy-duty boring mills or the like, much time and effort is expended in accurately positioning a workpiece on a worktable or platform. Moreover, this time and effort is considerably multiplied where several operations, e.g., drilling, boring, milling, tapping and slotting at definite angles, may be required on the same workpiece, each operation requiring the workpiece to be positioned on the worktable of a different machine or power tool.

Accordingly, the primary object of this invention is to provide an adapter device readily adapted for attachment to the headstock of a commercial boring mill and capable of interchangeably supporting various types of tool heads or units, whereby several milling operations may be performed with a single positioning of a workpiece on the worktable of the same mill.

A further object of the invention resides in the provision of an adapter device for supporting tool heads on a mill headstock which device allows angular adjustment of various heads supported thereon.

An important feature of the invention is the provision of structure on an adapter device for facilitating assembly and/or disassembly of a tool head therewith.

A further feature of the invention is defined by an adapter device which allows a supported tool head or unit to be rotated through 180° in a vertical plane about a horizontal axis normal to the axis of the adapter device whereby angle work may be effected by varying the angularity of the tool head instead of the workpiece.

Other objects and attendant advantages will be readily appreciated as the same becomes better understood by reference to the following detailed description when considered in conjunction with the accompanying drawings, wherein.

Figure 1:
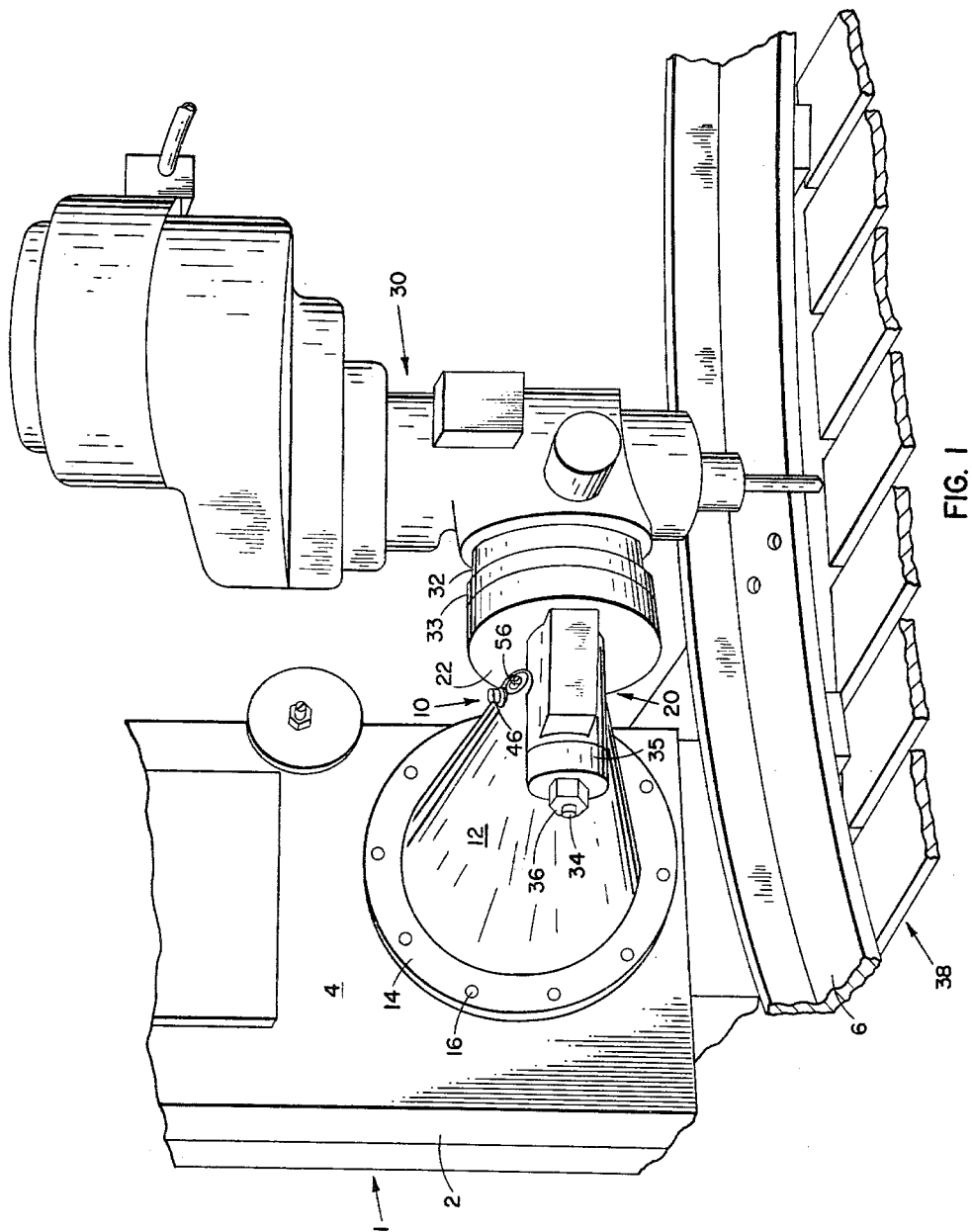
FIGURE 1 shows an adapter device, according to the invention, in assembly with its base secured to the vertical headstock face of a mill (partially shown) and its opposite end supporting a tool unit or head.

Referring more in detail to the several illustrations, the invention broadly comprises an adapter device 10 secured at its base end to the vertically disposed face 4 of headstock 2 (partially shown) of a heavy-duty, commercial, horizontal boring mill 1 (partially shown) and supporting on its opposite end a conventional power tool unit 30 in operative position relative to a workpiece 6 (partially shown) positioned on a work table 38 (partially shown).

Figure 3:
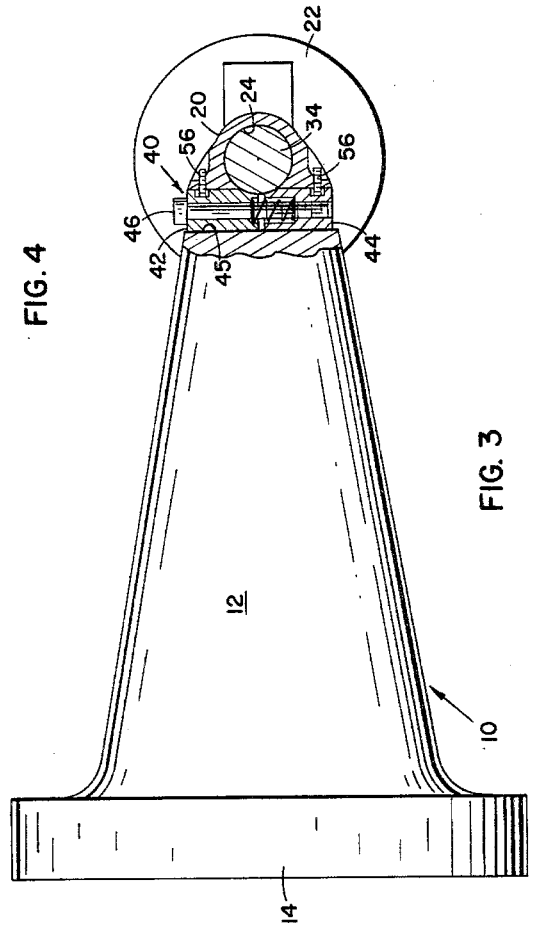
FIGURE 3 is a side view of the adapter device with part of the outer support arm broken away to show the relationship of a locking device with respect to the tool head shaft.
Figure 2:
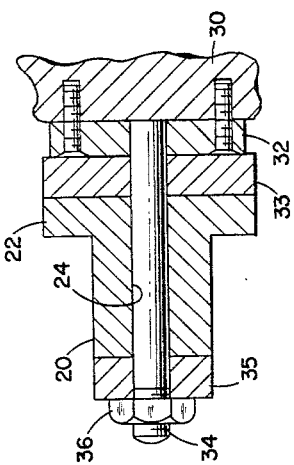
FIGURE 2 is a longitudinal section of the support arm on the outer end of the adapter device looking in a direction toward the mill headstock in FIGURE 1, the scale of FIGURE 2 being different from that of FIGURE 1.

Adapter device 10 includes an elongated, cone-shaped body 12, preferably of cast iron construction, provided on its base end with an annular, radially outwardly extending, base flange 14. Flange 14 has a plurality of circumferentially spaced apertures formed therein for receiving suitable mounting means, such as Allen-head setscrews 16, or the like. The apex end of body 12, i.e., the end opposite the base, is provided with an elongated preferably integral, support arm 20 adapted for supporting a conventional tool head 30 adjacent the fore end thereof. Tool head 30 may, for example, be of the type having a built-in electrical power unit. When the adapter assembly is secured to vertical face 4 of headstock 2 (FIGURE 1) support arm 20 is disposed with its longitudinal axis extending in normal relationship to the longitudinal axis of body 12, the latter axis extending normal to the headstock face. A circular adapter plate 22 is formed integral with, or otherwise secured to, the extended, forward portion of support arm 20, the adapter plate being concentrically disposed on the forward portion thereof. An axial bore 24 is formed centrally of support arm 20 and adapter plate 22 for receiving a spindle shaft 34 extending from and rigidly carried by a conventional tool head or unit 30. Spindle shaft 34 is of a slightly smaller diameter than the diameter of axial bore 24 to allow both axial and rotational movement therein. A second bore 45 is provided in body 12 extending normal to axial bore 24 in arm 20. Bore 45 intersects a side wall of bore 24, see FIGURE 3, thus cutting a peripheral portion of the side wall of the latter bore. Housed in bore 45 is a locking means 40 for positively locking shaft 34 extending therethrough against rotation.

Figure 4:
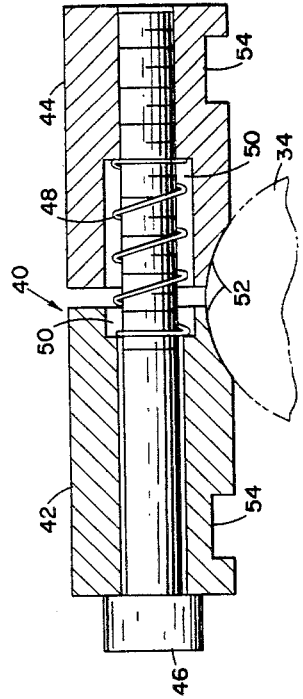
FIGURE 4 is a detailed view depicting the locking device used to lock the tool unit in selective angular positions relative to the support arm.

Locking means 40 includes a pair of cylindrical, upper and lower, locking elements 42, 44 each having a diameter which is slightly smaller than that of second bore 45 to allow relative axial movement therein. To retain the locking elements within bore 45, a limiting slot 54 is provided in the outer periphery of each of said elements to receive the inner end of a setscrew 56, which extends through an aperture provided in body 12. It is noted that the longitudinal length of slots 54 is of such extent as to allow limited axial movement of elements 42, 44 forward and away from each other when the inner ends of setscrews 56 are not in tight engagement within said slots. Thus, when setscrews 56 are extended axially inwardly into slots 54, axial movement of each of the locking elements is limited by the length of the slots. The locking elements are adapted to be slidably moved, vertically (FIGURE 3), within bore 45 by means of a headed adjusting stud 46 extending axially through each of the locking elements. To allow the adjusting stud to freely rotate within upper element 42, the inside, axial bore of said upper element is of a slightly larger diameter than the diameter of said stud extending therethrough. Lower locking element 44, however, is provided with mating threads for threadedly engaging the lower, threaded end of said stud, so as to allow the stud to be rotated within the lower element. Thus, the upper element is caused to move axially by engagement with the head of stud 46, while the lower element is caused to move axially by screw threaded engagement with the stud. Spring means 48 disposed within adjacent recessed areas 50 of elements 42, 44 tend to urge these elements apart when the latter elements are in an unlocked position, i.e., when setscrews 56 are not tightly engaged within the slots. Arcuate, cut-out portions 52 (FIGURES 3 and 4) are

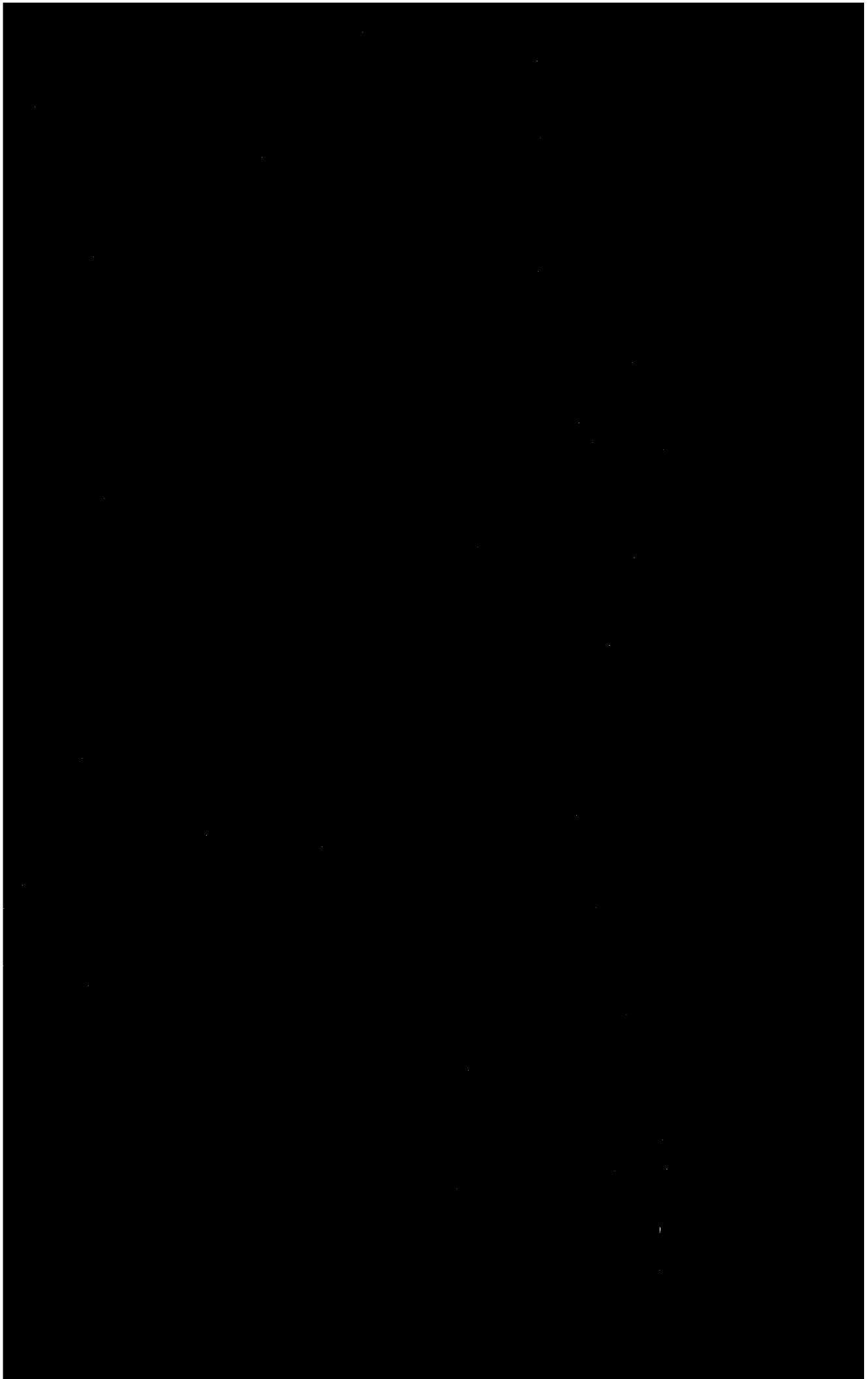

jacent said spindle shaft for locking said shaft against rotation within said bore;

said cone-shaped body further including a second bore provided in said body adjacent said axial bore, said second bore extending normal to said axial bore and intersecting its periphery near the midportion of its length, said second bore defining a housing for said locking means.

3. A device as set forth in claim 2, wherein the locking means includes:
- a pair of elongated, upper and lower, cylindrical locking elements axially slidable within said second bore in end to end relationship, the adjacent ends of said elements having a recess formed therein;
- a headed, adjusting stud extending with clearance axially through said upper element and having its lower end threadedly engaged axially within said lower element;
- spring means disposed between the adjacent ends of said elements with the opposite ends of said spring positioned in said recesses;
- said adjacent ends of said elements having arcuate, cut-out portions in a side wall thereof adapted for mating engagement with the periphery of said spindle shaft extending through said axial bore when said elements are moved by said adjusting stud in a contracting manner against the bias of said spring means within said second bore; and
means for retaining said elements in an adjusted position in said second bore.

4. A device as set forth in claim 3 wherein said last named means is defined by:
- an elongated slot provided in a peripheral side portion of each of said locking elements, said slot being provided in each of said elements near the end thereof opposite said cut-out portions;
- a pair of threaded holes provided in said cone-shaped body extending normal to said second bore and parallel to the axis of said body; and
- a setscrew received in each of said threaded holes for engagement of its inner end thereof into one of said slots, whereby tight engagement of the inner end of said setscrews with the inner wall of said slots effectively retains the locking elements in a selective position so as to lock the spindle shaft against rotation within said axial bore.

References Cited by the Examiner

UNITED STATES PATENTS 1,930,181   10/1933   Peters _____ 248—14 X
2,450,984   10/1948   Pastore _____ 51—229

CLAUDE A. LE ROY, *Primary Examiner.*

JOHN PETO, *Examiner.*